UNITED STATES PATENT OFFICE.

WALTER O. FLECKNER, OF CLOVERDALE, CALIFORNIA.

AIR-PROOF COMPOSITION.

1,212,925.  Specification of Letters Patent.  Patented Jan. 16, 1917.

No Drawing.  Application filed May 18, 1916.  Serial No. 98,412.

*To all whom it may concern:*

Be it known that I, WALTER O. FLECKNER, a citizen of the United States, residing at Cloverdale, in the county of Sonoma and State of California, have invented certain new and useful Improvements in Air-Proof Compositions; and I do hereby declare the following to be a full, clear, and exact description of the invention, such as will enable others skilled in the art to which it appertains to make and use the same.

The invention relates to a plastic composition for rendering valves of pneumatic tubes and various cocks and faucets air and liquid tight.

The object of the present invention is the production of a plastic composition of a simple and inexpensive nature adapted to be readily applied in the form of a paste within the valve of a pneumatic tire and the cap of the valve to prevent the leakage of air and capable also of use on various other valves and faucets to provide an air or liquid tight connection.

The composition consists of a mixture of common resin and tallow, either beef or mutton, combined in equal proportions but the proportions may be varied within certain limits and I have found advantageous results to be obtained by a mixture of one and one-half ounces of resin to one ounce of tallow, one ounce of resin to two ounces of tallow, two ounces of resin to three ounces of tallow and two ounces of resin to six ounces of tallow. In preparing the composition the resin and tallow are cooked together until well melted and are then set off to cool. After the mixture is cooled it is thoroughly beaten until it assumes a white color when it is ready for use. It is preferable to add a few drops of oil of anise to kill the smell of the resin but the composition will be equally effective without the addition of this ingredient.

The plastic composition which is designed to be put up in tin boxes or other receptacles is in the nature of a paste and is adapted to be filled into air valves of pneumatic tires and the caps of the valves and also into the bonnets of cocks and valves to effect a liquid tight joint or connection.

What is claimed is:—

1. The hereindescribed process of producing a plastic composition for forming an air and liquid tight joint or connection which consists in cooking together resin and tallow until the ingredients are well melted, allowing the mixture to cool and then beating the mixture until it assumes a white color.

2. The hereindescribed process of producing a plastic composition for forming an air and liquid tight joint or connection which consists in cooking together resin and tallow until the ingredients are well melted, allowing the mixture to cool and then beating the mixture until it assumes a white color, and adding a few drops of oil of anise.

In testimony whereof I affix my signature in presence of two witnesses.

WALTER O. FLECKNER.

Witnesses:
O. T. FLECKNER,
C. L. SEDGLEY.

Copies of this patent may be obtained for five cents each, by addressing the "Commissioner of Patents, Washington, D. C."